INVENTOR.
John B. Nichols
BY
Fryer + Johnson
ATTORNEYS

United States Patent Office 3,005,496
Patented Oct. 24, 1961

3,005,496
AIRFOIL BOUNDARY LAYER CONTROL MEANS
John B. Nichols, Atherton, Calif., assignor, by mesne assignments, to Hiller Aircraft Corp., Palo Alto, Calif., a corporation of California
Filed Aug. 24, 1959, Ser. No. 835,627
9 Claims. (Cl. 170—135.4)

This invention relates to boundary layer control means, and more particularly to operating means for controlling boundary layer energization in a helicopter rotor susceptible to blade stall.

A limitation is imposed on the speed of helicopters in forward flight by the tendency of the rotor blades to stall on the retreating side of its rotary cycle at high flight speeds. As the forward speed of the helicopter is increased, the retreating blade by going with the wind encounters decreasing relative air speeds. In order to compensate for this loss of velocity and maintain its share of the lift the retreating blade's angle of attack is increased. However, at some forward speed the rotor blade will stall, when the angle of attack is high and the velocity of airflow over the rotor blade is too low. Previous efforts have been made to delay the occurrence of blade stall by modifying the aerodynamic characteristics of the blade as by increasing its area to improve the lift or by twisting it to decrease the angle of attack at the tip.

Significant advances in the improvement of blade stall characteristics have been made by reducing the effects of the turbulent boundary layer which is predominant on airfoils at high angles of attack. Dispersal of the boundary layer has been accomplished by low energy suction or blowing systems which merely set the turbulent layer in motion, but superior performance has been realized by the provision of high energy systems which supplement the effects of boundary layer control with lift forces produced by the jetting of the pressure fluid medium, usually compressed air, from blade tip slots.

One major difficulty with high energy systems using compressed air or gases as a medium for boundary layer energization resides in the power requirement of such systems. Consequently, it is highly desirable to limit their operation to only those periods when they are needed, i.e. when the rotor blade is actually susceptible to stall. Various efforts have been made to provide valving which ejects the energizing pressure gas only during the retreating portion of the cycle but such valving would not provide maximum energy conservation because the retreating blade requires additional lift only at critical speeds and angles of attack. Moreover, with such valves at the hub, the time lag between their opening and the ejection of the gas at the rotor blade tip renders accurate time phasing virtually impossible. On the other hand, valves located right at the blade tip generally require complex controlling and timing devices at or near the hub in order to relate their operation to the rotation of the rotor blades.

It is, therefore, an object of this invention to provide boundary layer control means operable in anticipation of approaching blade stall measured by the occurrence of predetermined blade angles of attack.

It is a further object of this invention to provide boundary layer control means for a rotor blade which means are both located and controlled at the blade tip.

It is a further object of this invention to provide a high-energy boundary layer energizing system for helicopter rotor blades that is not operated unless needed to delay blade stall.

It is a further object of this invention to provide boundary layer control means for helicopter rotor blades that are simple, reliable and automatic in operation.

A helicopter rotor blade embodying features of this invention would be provided with a jet slot near the blade tip and conduit means to deliver compressed air or gas to the slot. The slot is opened and closed by valve means operable in response to pivotal movement of a control member relative to the rotor blade. The control member is provided with some means, such as an airfoil, for maintaining it in a fixed position relative to the relative wind direction so that the relative pivotal movement is provided by changes in the blade angles of attack. The valve is conditioned to open gradiently after the angle of attack reaches a critical range. When such angles of attack occur blade stall is avoided by ejecting an air stream from the slot to impart a reactive component of lift and to energize the boundary layer.

Other objects and advantages of my invention will become apparent from the specification following when read in connection with the accompanying drawings wherein.

Figure 5:
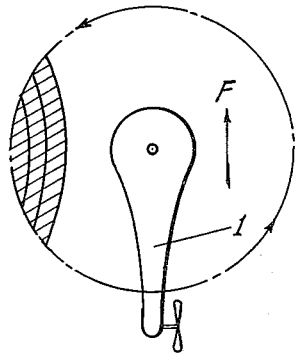
FIG. 5 is a schematic diagram illustrating the growth of blade stall.

Referring to FIG. 5, there is shown schematically the locale of blade tip stall at various speeds. Blade stall is induced in the rotor system of a helicopter 1 by high speed in directional flight, the stall occurring in the portion of the rotative cycle approximately 270° from the direction of flight. For example, with the helicopter moving in a forward direction indicated by the arrow F, the stall occurs first at the tip of the retreating blade on the left of the helicopter and spreads inboard with increases in speed as indicated by the shaded areas.

Figure 1:
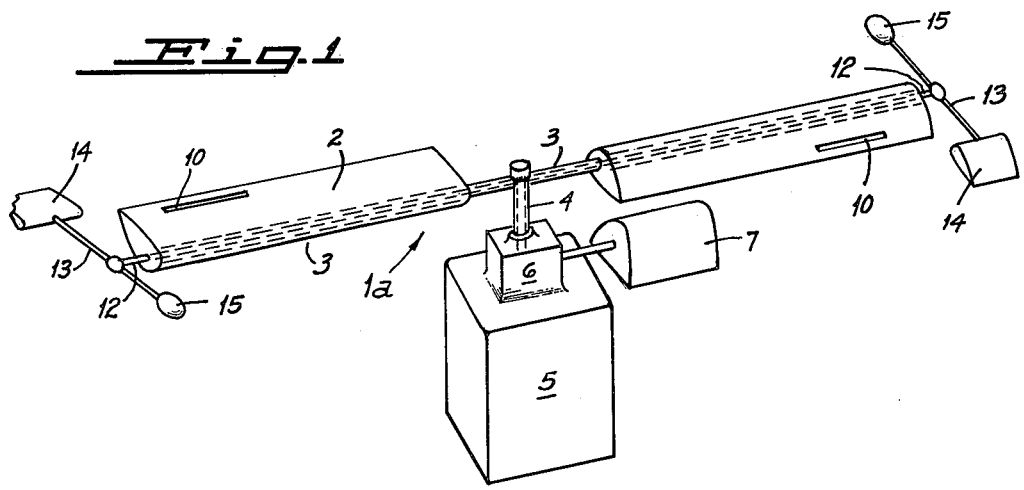
FIG. 1 is a schematic isometric representation of a helicopter rotor embodying features of this invention.

In FIG. 1, there is schematically represented a conventional helicopter main lift rotor system 1a including rotor blades 2 carried on spars 3 for rotation with an upright mast or main drive shaft 4. For reasons which will become apparent the spars 3 are tubular and extend to a point near the tip of each blade 2. The shaft 4 is driven by an engine 5 through a gear box 6.

Where compressed air is employed as the medium for boundary layer control, an air compressor 7 may be provided to deliver the pressure fluid into the hollow shaft 4 and through the tubular spars 3 to each blade tip, the compressor itself being operated by any suitable drive means, such as the gear box 6. Of course, other sources of pressure fluid may be employed with equal efficacy and for example where turbine engines are provided, air or pressurized gas may be bled from the engine itself. At the blade tip a series of passages 9 opening as ports 9a from the hollow blade spar lead to a slot 10 near the trailing edge of the blade. Thus, air from the compressor 7 may be ejected from the blade tip in a stream 10a at a high velocity. This jet of air sets the boundary layer in motion and also, because of its high velocity produces a reactive component of lift. The resultant increase in lift operates to delay the occurrence of the stall condition of the blade. The means for controlling this air jet system to restrict its operation, and hence its power requirements to those periods when blade stall is approaching is a particularly significant feature of this invention.

Rotatably carried in the tubular spar compressed air duct 3 is a suitable valve closure member 11 which may comprise simply an arcuate plate which may be rotated into and out of alignment with the ports 9a of the small discharge ducts 9. The valve closure 11 is rotated by means of a rod 12 secured thereto and journalled in the tip of the rotor blade 2 so as to be freely rotatable therein. To the end of the rod 12 which projects beyond the rotor blade tip is secured a lever arm 13 carrying at one end an airfoil vane 14 balanced at the other end by a counterweight 15. The vane is a symmetrical airfoil so that it aligns itself with an airstream flowing thereover. Thus, when the vane is carried around with the rotor tip, it is impinged upon by the relative wind adjacent the rotor tip and disposes itself parallel thereto. The counterweight 15 eliminates gravity as a factor affecting the angular disposition of the arm 13 and it retains a fixed association to the air flow near the blade tip at all speeds and is thereby held against pivoting. Consequently, any changes in the rotor blade pitch angles during the rotation thereof, will produce relative pivotal movement between the blade 2 and the vane arm 13 and hence, a turning of the jet ports 9a relative to the valve closure member 11.

Perhaps the most significant criterion of rotor condition of operation is the angle of attack at the tip of the retreating blade. The determination of this single parameter has been found to be an effective measurement of the susceptibility of the retreating blade to stall. For example, it has been found that, in the typical helicopter, blade tip stall occurs at an angle of attack between 12° and 16° and that at angles of attack above 15° and 16° stall usually becomes so severe as to prohibit operation. Consequently, the valve closure member 11 may be fixed onto the rod 12 at an angular disposition such that the ports 9a will remain closed until the angle of attack, visibly expressed by the relationship of the vane arm 13 to the blade chord B, exceeds a safe condition of operation, say 10°. Then, as the angular disposition of the blade chord relative to the vane arm 13 increases further, the ports 9a will be opened gradiently to eject a high energy stream of compressed air from the blade tip. The resultant reactive lift force and energization of the boundary layer is effective to delay blade stall to higher blade angles of attack.

Figure 3:
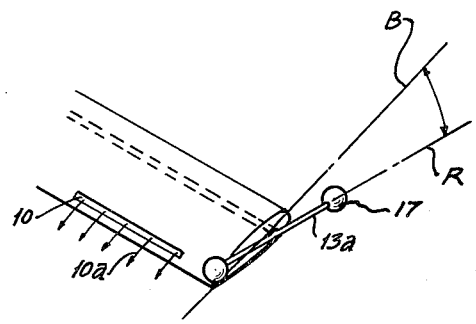
FIG. 3 is a partially isometric view of a rotor blade tip showing another valve control device.
Figure 4:
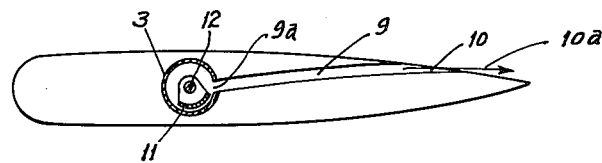
FIG. 4 is a schematic section view of the blade tip showing the arrangement of the jet slot control valve.

Another embodiment of this invention is illustrated in FIG. 3. There, the airfoil vane is replaced by a rod 13a carrying a pair of separated masses 17. Then, when the rotor blades 2 are rotating, the resultant centrifugal and gyroscopic effects imposed upon the masses 17 will cause them to orient themselves such that the line through the two centers of gravity, which preferably lies along the arm 13a, is parallel to the blade tip plane of rotation R. While the angle between the blade tip plane of rotation R and the blade chord B may vary somewhat from the blade angle of attack, it is close enough for all practical purposes. Thus, in either embodiment, the control rod 13 or 13a assumes a more or less fixed position at any given instant, being held by the vane, or the masses, against pivotal movement so that the relative angular disposition of the operating members of the valve 3, 11 is governed by the changing pitch angle of the rotor blade under the varying conditions of flight. When critical angles of attack signifying impending blade stall are reached, the valve is opened to eject the air stream 10a. If desired any suitable valve or clutch means may be provided selectively to prevent operation of the system, as during vertical flight.

Figure 2:
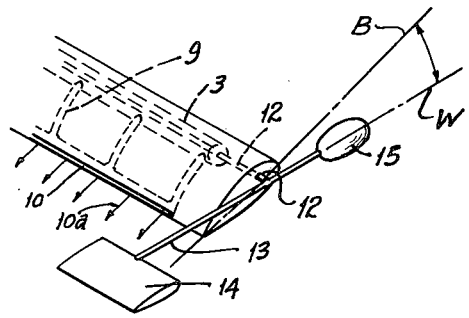
FIG. 2 is a partial isometric view of a rotor blade tip including the valve control device of FIG. 1.

In operation, as the helicopter gains forward speed, the air speed of the retreating blade decreases and its angle of attack is increased to produce its share of the lift. In the meantime, the control rod 13 or 13a remains disposed parallel to the relative wind with the airfoil vane of FIG. 2 or parallel to the blade path with the spaced masses of FIG. 3, and any increase in the angle of attack will produce relative pivoting between the rotor blade and the control rod, and therefore relative turning between the tubular spar air duct 3 and the valve closure 11 associated therewith. The valve closure 11 is conditioned to commence uncovering the ports 9a when the rotor blade 2 reaches a predetermined steep angle of attack approaching a condition of stall as for example 10° to 12°. Thereafter, a jet of compressed air is released from the trailing edge of the rotor blade to energize the boundary layer and impart a component of lift to the blade.

While there is here described and illustrated a preferred embodiment of this invention, it is apparent that other modifications and changes may be made therein without departing from the spirit and scope of the invention, which is intended to be limited only by the claims appended hereto.

What is claimed as invention is:

1. In an airfoil, fluid flow boundary layer control means comprising, a valve body fixed on said airfoil having a port, a closure member rotatable in said valve body about a spanwise axis to cover and uncover said port, a control arm carried by said closure member and operative when pivoted to rotate said closure member in said valve body, and means restraining said control arm against pivotal movement whereby said airfoil will pivot relative to said control arm in response to a change in the angle of attack of said airfoil and rotate said valve body on said closure member.

2. The combination defined in claim 1 wherein said restraining means comprises a pair of spaced members on said control arm and having fixed positions relative to each other during movement of said airfoil.

3. The combination defined in claim 1 wherein said restraining means comprises an aerodynamic member on said control arm conditioned to be held in a fixed disposition by and relative to the relative wind adjacent said airfoil.

4. In a helicopter rotor blade adjustably mounted for pitch angle control, a valve body having a port therein fixed on said rotor blade and connected to a source of pressure fluid, a valve closure member rotatable in said valve body about a spanwise axis to cover and uncover said port, a slot opening from said rotor blade in communication with said port, a laterally extending control arm carried by said closure member to pivot about the axis thereof, and restraining means holding said control arm substantially parallel to the relative wind adjacent said rotor blade at any instant whereby a change in the angle of attack of said rotar blade will rotate said valve body on said closure member.

5. In a helicopter rotor blade adjustably mounted for variation in pitch angle of attack as the blade rotates; automatic fluid flow boundary layer control means for precluding stalling of the blade on the retreating side of its rotary cycle, comprising a valve body fixed to said blade and having a port communicating with a slot in the blade and through which boundary layer control fluid can flow, a valve closure member mounted in said blade for rotation about a spanwise axis relative to said port to cover and uncover said port, a control arm extending chordwise of the blade at the tip end thereof and fixedly connected to said closure member whereby both said closure member and said control arm can rotate together relative to said port; and means carried by said control arm for restraining said control arm and closure member against rotary movement whereby a change in angle of attack of said blade will cause said valve body fixed to the blade to rotate with respect to said restrained valve closure member.

6. The control means of claim 5 wherein said restraining means on said control arm comprises a pair of spaced apart members carried by said control arm adjacent the extremities thereof and having fixed positions relative to each other during movement of said blade.

7. The control means of claim 5 wherein said restraining means comprises a substantially symmetrical airfoil carried by one end of the arm to align with an airstream flowing thereover, and a counterweight carried by the opposite end of the arm, whereby said arm is held substantially parallel to the relative wind adjacent said blade.

8. In a helicopter rotor blade adjustably mounted for variation in pitch angle of attack as the blade rotates; automatic fluid flow boundary layer control means for precluding stalling of the blade on the retreating side of its rotary cycle, comprising a valve body fixed to said blade and having a port communicating with a slot in the blade and through which boundary layer control fluid can flow, a valve closure member mounted in said blade for rotation about a spanwise axis relative to said port to cover and uncover said port, a control arm extending chordwise of the blade at the tip end thereof and fixedly connected to said closure member whereby both said closure member and said control arm can rotate together relative to said port; and means carried by said control arm for restraining said control arm and closure member against rotary movement whereby a change in angle of attack of said blade will cause said valve body fixed to the blade to rotate with respect to said restrained valve closure member, said valve closure member being an arcuate plate for uncovering said port gradiently only after the pitch of said blade reaches a predetermined angle approaching a condition of stall.

9. The control means of claim 8 wherein said restraining means comprises a pair of spaced apart members carried by said control arm adjacent the extremities thereof for maintaining said control arm substantially parallel to the relative wind adjacent said blade.

References Cited in the file of this patent

UNITED STATES PATENTS

| 1,777,282 | Constantin | Oct. 7, 1930 |
| 2,082,674 | Young | June 1, 1937 |
| 2,617,487 | Stalker | Nov. 11, 1952 |
| 2,638,990 | Pitcairn | May 19, 1953 |
| 2,734,704 | Vogt | Feb. 14, 1956 |
| 2,759,548 | Yuan et al. | Aug. 21, 1956 |
| 2,892,502 | Donovan | June 30, 1959 |

FOREIGN PATENTS

| 993,082 | France | July 18, 1951 |
| 147,416 | Australia | July 21, 1952 |
| 512,363 | Italy | Jan. 31, 1955 |

OTHER REFERENCES

Aviation Week, December 17, 1956, pages 50 and 51.